United States Patent Office 3,778,498
Patented Dec. 11, 1973

3,778,498
PROCESS FOR RECOVERING URANIUM
Masayuki Yano, Iwao Yamamoto, and Nobuo Yasuhira, Kurashiki, Japan, assignors to Kuraray Co., Ltd., Kurashiki, Japan
No Drawing. Filed Dec. 29, 1970, Ser. No. 102,536
Claims priority, application Japan, Dec. 29, 1969, 45/818; Mar. 12, 1970, 45/21,037; Aug. 31, 1970, 45/76,551
Int. Cl. C01g 56/00
U.S. Cl. 423—7
13 Claims

ABSTRACT OF THE DISCLOSURE

A process for recovering uranium from a uranium-bearing aqueous solution which comprises contacting a titanated polyvinyl alcohol in the form of particles, flakes, films, filaments, fibers, battings or fabrics with a uranium-bearing aqueous solution to absorb the uranium on the titanated polyvinyl alcohol, and thereafter desorbing the uranium with an aqueous solution of sodium carbonate or ammonium carbonate.

---

This invention relates to a process for recovering uranium effectively by adsorbing uranium from a uranium-bearing aqueous solution using titanated polyvinyl alcohol as an absorbent and then desorbing uranium.

The uranium-bearing aqueous solution, i.e. a dilute aqueous solution containing uranium as, for example, uranyl ion $UO_2^{2+}$, is obtained as a processing liquor resulting in the course of smelting uranium ore or as a spent liquor in a nuclear furnace. The seawater also contains about 3 mg./m.$^3$ of uranium in the form of tricarbonate complex $UO_2(CO_3)_3^{4-}$. It is very desirable to recover uranium with good efficiency from these uranium-bearing aqueous solutions.

Heretofore, extraction with certain organic solvents, adsorption with various ion-exchange resins, and adsorption with various inorganic absorbants, for instance, titanium oxide, titanium hydroxide, basic zinc carbonate, lead sulfide, or lead pyrophosphate have been proposed as methods of recovering uranium from uranium-bearing aqueous solutions (see Nature, Sept. 12, 1964, vol. 203, pages 1110–1115). However, all of these prior proposals do not give truly good results of recovering uranium, and have not proved satisfactory.

It has now been found that uranium can be adsorbed with good selectivity and efficiency from uranium-bearing aqueous solutions.

It has now been found that a titanated polyvinyl alcohol adsorbs uranium with good selectivity and efficiency from a uranium-bearing aqueous solution. It has also been found that uranium so absorbed can be readily desorbed by treatment with an aqueous solution of sodium carbonate or ammonium carbonate in the same manner as in the case of using an inorganic adsorbent in the conventional method.

Accordingly, an object of this invention is to provide a process for recovering uranium from a uranium-bearing aqueous solution with good efficiency.

The process for recovering uranium from a uranium-bearing aqueous solution according to the invention comprises contacting a titanated polyvinyl alcohol with the uranium-bearing aqueous solution to cause the titanated polyvinyl alcohol to adsorb uranium, and thereafter desorbing uranium so adsorbed using an aqueous solution of sodium carbonate or ammonium carbonate.

The invention will be described below in greater detail.

The titanate polyvinyl alcohol itself is known by U.S. Pat. 2,518,193, for instance. It is prepared by reacting polyvinyl alcohol with an aqueous solution of a water-soluble compound of tetravalent titanium such as α-titanic acid, titanium sulfate and titanyl sulfate. Titanium tetrachloride can also be used as it can be converted to α-titanic acid by diluting with water. By the reaction, titanium is bonded in the molecule of polyvinyl alcohol in the following form

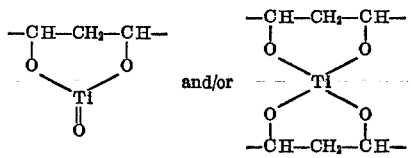

In other words, the titanated polyvinyl alcohol is polyvinyl alcohol containing chelated titanium in the molecule. Since the bonding of titanium occurs in a non-crystalline region of the polyvinyl alcohol, it hardly occurs in a highly oriented or highly crystalline polyvinyl alcohol. The content of bound titanium, therefore, depends upon the size of the noncrystalline region present in the starting polyvinyl alcohol. On the other hand, the amount of uranium to be adsorbed depends upon the amount of titanium contained in the titanated polyvinyl alcohol. For use as the adsorbent according to the process of the invention, titanated polyvinyl alcohols containing at least 3% by weight, preferably 6 to 13% by weight, of titanium are suitable. Polyvinyl alcohols having excessive titanium have too large a non-crystalline region and therefore have reduced mechanical strength. Thus, they are not particularly good for actual application.

The titanated polyvinyl alcohol as the absorbent may be in any desired form such as particles, flakes, films, fibers or filaments, battings, or fabrics. The fabrics include knitted fabrics, woven fabrics, and net or screen fabrics. The titanation can be effected before or after shaping of the starting polyvinyl alcohol.

The titanated polyvinyl alcohol can be used in a form coated on the surface of any kind of fibrous material. Such a form is particularly suitable where mechanical strength is required, for instance, when it is necessary to dip it in the swaying seawater for adsorption of uranium. By coating a titanated polyvinyl alcohol having a large non-crystalline area and much bound titanium on the surface of a tough substrate fibrous material, it is possible to make an absorbent material having high mechanical strength and a large uranium-absorbing ability.

The aforementioned absorbent material can be produced by coating or impregnating a fibrous material, such as fibers, cloths or nets, having sufficient strength with a ca. 5–20% aqueous solution of polyvinyl alcohol, if desired removing excess solution by squeezing with a roll, thereafter dipping the treated fibrous material in a bath for coagulating the polyvinyl alcohol, dipping it in a titanation bath, i.e. an aqueous solution of a water-soluble compound of tetravalent titanium, and then washing it with water. A suitable coagulating bath is an aqueous solution of sodium sulfate or ammonium sulfate. An aqueous solution of sodium hydroxide can also be used as the coagulating bath. In this case, however, the material dipped in the coagulating bath should be thoroughly washed with water before subjecting it to the titanation bath treatment, because the precipitation of titanium would occur without it. The time required for coagulation is as short as about 10 seconds. In an alternative embodiment, the fibrous material may be dipped in the aqueous polyvinyl alcohol solution, then dried to some extent without dipping in the coagulating bath, and then directly introduced into the titanation bath.

When the starting material is a fiber, it is desirable to split it after being dipped in the aqueous polyvinyl alcohol solution, and then treating it in the titanation bath. If the individual fibers get close to one another, it will be difficult to split them after the tintanation treatment. The starting fibrous material may be of any desired type, such as cotton, flax, Vinylon, polyamides, polyesters, polypropylene, or polyacrylonitrile. The Vinylon fibrous material is preferred because the coagulated polyvinyl alcohol is most firmly fixed thereto and it is tough. When a filter in the batting form is to be produced, polyamide or polyester textile products are preferred which have good heat-setting properties and do not deform in water. The product so obtained has a high content of bound titanium and retains its strength by the supporting fibrous material, because the polyvinyl alcohol coated by coagulation is non-crystalline and not oriented. Therefore, the product is very suitable and ideal as the absorbent used in the process of the invention.

The uranium-adsorbing ability of the titanated polyvinyl alcohol varies somewhat depending upon the pH and temperature of the uranium-bearing aqueous solution besides the content of bound titanium. The pH for exhibiting a suitable adsorbability is from 3.2 to 8.5. Therefore, the titanated polyvinyl alcohol can be applied to the seawater having a pH of about 8.3. The most preferred pH range is from 4.0 to 6.5. The temperature of the aqueous solution can be from room temperature to 100° C., preferably at least about 22° C., more preferably at least about 40° C.

The uranium adsorption rate, namely the time required for uranium to be adsorbed by the titanated polyvinyl alcohol until saturation, depends upon the concentration of uranium in the aqueous solution. For a high concentration solution, the time is from several hours to about 10 hours, and for a dilute solution such as sea water, it is about 3 to 4 days. The uranium-adsorbing ability of the titanated polyvinyl alcohol is high, and reaches about 1.7 g. of uranium per gram of titanium. Furthermore, the titanated polyvinyl alcohol excels in the selective uranium-absorbing ability, and does not adsorb other ions, such as ions of Na, K, Zn, Mg, Ca, Ni, Mn, Cr, Cu, Sr, Cl, I, Br, B, $MoO_4$, $WO_4$ or $CrO_4$.

The titanated polyvinyl alcohol to which uranium has been adsorbed is immersed in a customary manner in an aqueous solution of sodium carbonate or ammonium carbonate to thereby desorb the uranium. It is desirable that the concentration of the carbonate in the desorbing solution should be at least 0.5 mol. Lower concentrations do not ensure sufficient desorbability. At a concentration exceeding 1.5 mols, however, the desorbability no longer increases. The preferred concentration is from 0.8 to 1.1 mols. The temperature that can be applied to the desorption is from room temperature to 100° C., and the desorption rate is larger at higher temperatures. Therefore, the preferred temperature is at least 50° C., and temperatures of at least 80° C., are more suitable. The ratio of the treating absorbent material to the desorbing solution bath is 1:100 or more by volume when the concentration is 0.5 mol, and 1:50 or more by volume when the concentration is 1.5 mols. Most e.g. about 80% of the uranium adsorbed to the titanated polyvinyl alcohol is easily desorbed. The titanated polyvinyl alcohol after desorption can be repeatedly used for adsorption of uranium.

The following examples will illustrate the invention. The expression "PVA" stands for polyvinyl alcohol. The quantitative analysis of uranium was performed by a known colorimetric method. When uranium has a high concentration above 10 p.p.m., a uranium-containing solution is neutralized, and then a certain amount of the neutralized solution is taken as a sample. Predetermined amounts of an aqueous solution of sodium carbonate and an aqueous solution of hydrogen peroxide, and uranium is quantitatively analyzed by colorimetric method. When the concentration of uranium is less than about 10 p.p.m., uranium is extracted with chloroform from a uranium-containing solution, chloroform is evaporated, and the solid residue is fired at about 400° C. The resulting ash is dissolved in hydrochloric acid, and Dotite reagent made by Wako Pure Chemical Company, Japan, is added in this solution and thereafter uranium is quantitatively analyzed by colorimetry.

EXAMPLE 1

Fifty (50) grams of PVA flakes were immersed for 2 hours at 40° C. in 3,000 g. of an aqueous solution containing 12.0% of α-titanic acid, 15.4% of hydrochloric acid, and 9.0% of sodium sulfate, and then washed with water to produce titanated PVA flakes containing 12.3% of titanium.

The titanated PVA flakes were immersed for 24 hours in an aqueous solution at 60° C. containing uranyl nitrate in a concentration, calculated as uranium, of 1,200 p.p.m. and having a pH of 5.5 adjusted with sodium carbonate. The ratio of the PVA flakes to the aqueous solution was 1:200. The treated PVA flakes were then immersed for 15 minutes at 80° C. in an aqueous solution of sodium carbonate with a concentration of 0.6 mol. The ratio of the treated flakes to the aqueous solution was 1:100. Analysis of the uranyl nitrate solution after adsorption of uranium showed that it adsorbed 211 mg. of uranium per gram of the titanated PVA flake.

EXAMPLE 2

One hundred grams of spun PVA fibers were immersed for 2 hours at 40° C. in 8,000 grams of an aqueous solution containing 12.1% of α-titanic acid, 13.5% of hydrochloric acid, and 9.0% of sodium sulfate, and then washed with water to produce titanated PVA fibers containing 8.46% of titanium.

The titanated PVA fibers were immersed for 8 hours in an aqueous solution at 55° C. containing sodium uranyl tricarbonate ($Na_4UO_2(CO_2)_3$) in a concentration of 2,000 p.p.m. calculated as uranium and having a pH, adjusted with hydrochloric acid, of 4.7 in the same manner as in Example 1. The ratio of the treated fibers to the aqueous solution was 1:200. It was found that 168 mg. of uranium was adsorbed per gram of the titanated PVA fibers.

EXAMPLE 3

Twenty grams of PVA film were immersed for 2 hours in 1,000 g. of an aqueous solution at 40° C. containing 7% of titanyl sulfate, 10% of sulfuric acid and 10% of sodium sulfate to produce a titanated PVA film containing 8.1% of titanium.

The titanated PVA film was immersed for 5 hours in an aqueous solution at 50° C. containing sodium uranyl tricarbonate in a concentration, calculated as uranium, of 900 p.p.m. and having a pH, adjusted with nitric acid, of 6.6 The ratio of the treated film to the aqueous solution was 1:200. Thereafter, the treated film was immersed for 10 minutes in an aqueous solution containing ammonium carbonate in a concentration of 1 mol. The ratio of the PVA film to the aqueous solution was 1:150. It was found that 130 mg. of uranium were recovered per gram of the titanated PVA film.

EXAMPLE 4

Twenty grams of PVA fibers which had not been drawn in dry heat but heat-shrunk by 10% after spinning were immersed for 2 hours in 1,000 g. of an aqueous solution at 40° C. containing 7% of titanic sulfate, 10% of sulfuric acid and 10% of sodium sulfate, and then washed with water to produce titanated PVA fibers containing 7.2% of titanium.

The titanated PVA fibers were immersed for 8 hours in an aqueous solution at 25° C. containing sodium uranyl tricarbonate in a concentration, calculated as uranium, of 700 p.p.m. and having a pH, adjusted with hydrochloric acid, of 7.6. The ratio of the titanated PVA fibers to the aqueous solution was 1:200. Thereafter, the titanated PVA fibers so treated were desorbed in the same manner as in Example 3 except that the ratio of the fibers to the desorbing solution was 1:100. Uranium could be recovered in an amount of 61 mg. per gram of the titanated PVA fibers.

Activated carbon was immersed in a solution of α-titanic acid having a titanium concentration of 4%, and then in an 8 N aqueous solution of sodium hydroxide, followed by washing with water to produce α-titanic acid-supported activated carbon with a titanium content of 13.1%.

When the activated carbon was immersed for 8 hours in the same uranium-bearing solution as used in the first part of Example 4, only 11 mg. per gram of activated carbon, of uranium could be adsorbed.

EXAMPLE 5

A woven fabric of Vinylon was immersed in a 10% aqueous solution of PVA, and excess solution was removed by a roll. The fabric so treated was then immersed in a solution of sodium sulfate in a concentration of 400 g./liter to coagulate PVA. The fabric was then immersed for 30 minutes at 40° C. in an aqueous solution containing 11.0% of α-titanic acid, 13.5% of hydrochloric acid, and 10% of sodium sulfate, and then washed with water. The fabric had a titanium content of 5.1% based on the total weight of the fabric. The fabric was then immersed for 2 days at 30° C. in a solution containing uranium nitrate in a concentration of 1,000 p.p.m. and having a pH of 5 to adsorb uranium (with the ratio of the fabric to the solution being 1:150), and then immersed in an aqueous solution of sodium carbonate in a concentration of 1 mol (with the ratio of the fabric to the solution being 1:200) at 80° C. to desorb uranium. Uranium could be recovered in an amount of 111 mg. per gram of the fabric.

EXAMPLE 6

Highly oriented and crystallized Vinylon fibers (degree of formalization 31.1%) were immersed in an 8% aqueous solution of PVA, and then subjected to a centrifugal separator at 1,000 r.p.m. to remove excess solution. The fibers were split, and immersed in a coagulating bath containing ammonium sulfate in a concentration of 400 g./liter to coagulate PVA. The fibers were treated for 30 minutes at 40° C. in a solution consisting of 8.0% of α-titanic acid, 13.5% of hydrochloric acid, and 10% of ammonium sulfate, and washed with water. The fibers contained 6.2% of titanium based on the total weight of the fibers. The fibers were made into a filter-like form, and an aqueous solution of 70 p.p.m. of sodium uranyl tricarbonate having a pH of 8 (with the ratio of the fibers to the aqueous solution being 1:1000) was circulated through the filter for 3 days at 30° C. The filter was then immersed in an aqueous solution of ammonium carbonate in a concentration of 1 mol (with the ratio of the filter to the aqueous solution being 1:100) at 90° C. to desorb uranium. Uranium could be recovered in an amount of 30 mg. per gram of the fibers in the filter form.

EXAMPLE 7

Nylon-6 fibers of 10 denier which had been cold drawn 4 times were made into a filter having a mesh size of about 20 mesh, and then heat-treated at 180° C. for 30 minutes. The filter was immersed for 15 minutes in an 8% aqueous solution of PVA, and then withdrawn from the solution. Excess solution was removed by applying a compressed air at about 1.5 kg./cm.² to the filter. The filter was then immersed in an aqueous solution of sodium sulfate in a concentration of 400 g./liter to coagulate PVA, then immersed for one hour in an aqueous solution at 40° C. containing 8% of titanyl sulfate, 15% of sulfuric acid and 8% of sodium sulfate, and then washed with water. The filter contained 4.2% of titanium based on the total weight of titanium. Imitation sea water containing 500 p.p.m. of uranium was circulated through the filter (with the ratio of the filter to the sea water being 1:100) for three days, and immersed in an aqueous solution at 50° C. containing 0.5 mol of sodium carbonate and 0.5 mol of ammonium carbonate (with the ratio of the filter to the aqueous solution being 1:100) to desorb uranium. Uranium could be recoverel in an amount of 20 mg. per gram of the filter.

EXAMPLE 8

A 10-mesh net produced from high tenacity Vinylon was immersed in a 10% aqueous solution of PVA, and lightly squeezed with a roll to remove excess solution. The net in a taut state was immersed in an aqueous solution of sodium sulfate in a concentration of 400 g./liter to coagulate PVA, and then immersed for one hour in an aqueous solution at 40° C. containing 13% of α-titanic acid, 14.2% of hydrochloric acid and 8% of sodium sulfate. The treated net contained 7.3% of titanium based on the total weight of the net. The net was then cut into 20 square pieces each having a size of 5 x 5 cm. A rectangular parallelepiped filter was produced by placing these pieces at intervals of 5 mm. One hundred liters of water containing 0.003 p.p.m. of uranium were circulated through this filter for 5 days, and then uranium was desorbed in the same way as set forth in Example 6. Uranium could be recovered in an amount of 270 µg.

EXAMPLE 9

A Vinylon cloth in a taut state was coated at both surfaces with a 15% aqueous solution of PVA, dried, and immersed for 2 hours at 40° C. in an aqueous solution containing 12% of α-titanic acid, 13.1% of hydrochloric acid and 11% of sodium sulfate. The Vinylon cloth so treated had a titanium content of 8.2% based on the total weight. The Vinylon cloth in a streamer form was immersed for 4 days in an aqueous solution containing uranium in a concentration of 1,000 p.p.m. and having a pH of 5 (with the ratio of the cloth to the aqueous solution being 1:200). Thereafter, the cloth was further immersed in an aqueous solution of ammonium carbonate in a concentration of 1.5 mol at 90° C. to desorb uranium. Uranium could be recovered in an amount of 110 mg. per gram of the Vinylon cloth.

EXAMPLE 10

A polyester net of 100 mesh in a taut state was coated at both surfaces with an 18% aqueous PVA solution, and dried. The net was then titanated in the same way as set forth in Example 9. The titanated PVA polyester net contained 10.8% of titanium based on the total weight of titanium. The net was immersed for 4 days at 30° C. in an aqueous solution containing 1,200 p.p.m., calculated as uranium, of uranyl sulfate (with the ratio of the net to the aqueous solution being 1:100), and then uranium was desorbed under the same conditions as set forth in Example 5. Uranium could be recovered in an amount of 79 mg. per gram of the titanated PVA net.

EXAMPLE 11

Twenty grams of PVA flakes were immersed for 2 hours at 40° C. in 1,000 g. of an aqueous solution containing 11.0% of α-titanic acid, 13.5% of hydrochloric acid, and 10% of sodium sulfate, and washed with water to form titanated PVA flakes containing 12.1% of titanium.

The titanated PVA flakes were immersed for 5 days at 30° C. in sea water (with the ratio of the flakes to the sea water being 1:150,000), and then immersed in an aqueous solution of sodium carbonate in a concentration of 0.8 at 95° C. (with the ratio of the flakes to the aqueous solution being 1:100). It was found that 351 µg. of uranium was adsorbed based on the total amount of the titanated PVA flakes.

For comparative purposes, activated carbon having adsorbed thereto 19.7% of titanium oxide (calculated as titanium) was used instead of the titanated PVA flakes in Example 11, and immersed in sea water under the same conditions. Uranium was adsorbed in an amount of 151 µg. per gram of the titanium-adsorbed activated carbon.

It is clear from the comparison of both that the uranium-adsorbing ability of titanated PVA is about twice that of the activated carbon. In terms of the amount of titanium, the titanated PVA has a uranium-adsorbing ability about 4 times that of titanium adsorbed activated carbon.

EXAMPLE 12

PVA fibers of 6 denier, which had been obtained by spinning with the use of an aqueous solution of sodium sulfate as a coagulating bath and then drawing 300%, were shrunk 10% in an oven at 230° C. Ten grams of the resulting fibers were immersed for 2 hours at 40° C. in 1,000 g. of an aqueous solution containing 8% of α-titanic acid, 9.82% of hydrochloric acid, and 41% of sodium sulfate, and then washed with water to produce titanated PVA fibers containing 7.7% of titanium.

The titanated PVA fibers were immersed for 5 days at 30° C. in sea water (with the ratio of the fibers to the sea water being 1:150,000) to desorb uranium, and then immersed for 30 minutes in 500 g. of an aqueous solution of sodium carbonate in a concentration of 1.1 mols at 98° C. Uranium could be recovered in an amount of 299 μg. based on the total weight of the titanated PVA fibers.

When the titanated PVA fibers were used again under the same conditions to absorb uranium, followed by desorption, 271 μg. of uranium could be recovered. The same cycle repeated for the third time resulted in the recovery of 282 μg. of uranium, and the fourth cycle led to the recovery of 251 μg. of uranium.

EXAMPLE 13

PVA fibers, which were obtained by spinning with an aqueous sodium sulfate solution as a coagulating bath followed by 300% drawing, 20% drawing in dry heat and 5% heat shrinking were immersed for 2 hours in a solution at 45° C. containing 8% of titanyl sulfate, 10% of sulfuric acid and 10% of sodium sulfate (with the ratio of the PVA fibers to the aqueous solution being 1:30) to produce titanated PVA fibers containing 6.7% of titanium. The PVA fibers were woven into a cloth. The cloth was sewn into a streamer, which was then immersed in sea water for 10 days and immersed in a desorbing solution of ammonium carbonate. Uranium was recovered in an amount of 389 μg. per gram of the titanated PVA fibers.

We claim:

1. A process for recovering uranium values as an aqueous solution containing the same from a starting dilute aqueous solution containing uranium values, the uranium values having been more concentrated in the recovered solution than in the starting solution, which comprises the steps of: contacting a titanated polyvinyl alcohol, as an adsorbent, with said starting solution to adsorb the uranium values thereon, immersing the titanated polyvinyl alcohol containing adsorbed uranium values in a desorbing aqueous solution of sodium or ammonium carbonate of 0.5–1.5 molar concentration to desorb and dissolve the uranium values in the form of uranyltricarbonate ions into said desorbing solution, the volume of the desorbing solution being smaller than the starting solution, and recovering the so-obtained desorbing solution.

2. The process of claim 1, wherein said titanated polyvinyl alcohol is in the form of particles, flakes, films, filaments, fibers, battings or fabrics.

3. The process of claim 1, wherein said titanated polyvinyl alcohol is coated on a fibrous material.

4. The process of claim 1, wherein said titanated polyvinyl alcohol has at least 3% by weight of titanium bound thereto.

5. The process of claim 1, wherein said titanated polyvinyl alcohol has at least 6% by weight of titanium bound thereto.

6. The process of claim 1, wherein said starting dilute aqueous solution containing uranium values has a pH of from 3.2 to 8.5.

7. The process of claim 1, wherein said starting dilute aqueous solution containing uranium values has a pH of from 4.0 to 6.5.

8. The process of claim 1, wherein said starting dilute aqueous solution containing uranium values in sea water.

9. The process of claim 1, wherein said starting dilute aqueous solution containing uranium values is maintained at a temperature of at least about 22° C.

10. The process of claim 1, wherein said starting dilute aqueous solution containing uranium values is maintained at a temperature of at least about 40° C.

11. The process of claim 1, wherein the concentration of said carbonate in the desorbing aqueous solution is from 0.5 to 1.5 mols.

12. The process of claim 1, wherein the desorbing treatment is carried out at a temperature of at least about 50° C.

13. The process of claim 1, wherein the desorbing treatment is carried out at a temperature of at least about 80° C.

References Cited

UNITED STATES PATENTS

| | | | |
|---|---|---|---|
| 3,088,799 | 5/1963 | Fetscher | 23—338 |
| 3,155,455 | 11/1964 | Hart | 23—337 |
| 3,183,059 | 5/1965 | Reisenauer et al. | 23—337 |
| 3,265,471 | 8/1966 | Pottier et al. | 23—338 |

STEPHEN J. LECHERT, JR., Primary Examiner

U.S. Cl. X.R.

423—15; 252—301.1 R